United States Patent [19]

Verma

[11] Patent Number: 5,717,916
[45] Date of Patent: Feb. 10, 1998

[54] METHOD FOR PROVIDING AN IMPROVED FULLY ASSOCIATIVE CACHE MEMORY HAVING A FINITE STATE MACHINE AND LINKED LIST STRUCTURE

[75] Inventor: Deepak Verma, Phoenix, Ariz.

[73] Assignee: VLSI Technology, Inc., San Jose, Calif.

[21] Appl. No.: 315,795

[22] Filed: Sep. 30, 1994

[51] Int. Cl.[6] .................................................. G06F 13/00
[52] U.S. Cl. ........................... 395/607; 395/611; 395/612; 395/800
[58] Field of Search .................................. 395/800, 607, 395/611, 612

[56] References Cited

U.S. PATENT DOCUMENTS

| | | | |
|---|---|---|---|
| 4,499,539 | 2/1985 | Vosacek | 364/200 |
| 4,574,346 | 3/1986 | Hartung | 364/200 |
| 4,636,946 | 1/1987 | Hartung et al. | 364/200 |
| 5,390,318 | 2/1995 | Ramakrishnan et al. | 395/425 |

OTHER PUBLICATIONS

DeCegma, "Parallel Processing Architectures and VLSI Hardware" pp. 318–331 Prentic–Hall Inc. Englewood Cliffs, New Jersey (1989).

*Primary Examiner*—Jack B. Harvey
*Assistant Examiner*—Valerie Darbe
*Attorney, Agent, or Firm*—Harry M. Weiss; Jeffrey D. Moy; Harry M. Weiss & Associates, P.C.

[57] ABSTRACT

A fully associative cache memory has a finite state machine which creates and maintains a linked list structure within the cache. This linked list structure allows the fully associative cache memory to be implemented in a structure other than a complex FIFO arrangement, as is typically required by systems of the prior art.

6 Claims, 1 Drawing Sheet

METHOD FOR PROVIDING AN IMPROVED FULLY ASSOCIATIVE CACHE MEMORY HAVING A FINITE STATE MACHINE AND LINKED LIST STRUCTURE

BACKGROUND OF THE INVENTION

1. Field of the Invention

This invention generally relates to fully associative cache memories in computer systems, and more specifically relates to a method for providing an improved fully associative cache memory having a linked list structure which is controlled by a finite state machine.

2. Description of the Related Art

Prior art solutions to fully associative cache memories require a content addressable memory which is used in a FIFO structure. The oldest entry in the FIFO (bottom of FIFO) is the least recently used (LRU) line. The latest entry in the FIFO (top of FIFO) is the most recently used (MRU) line. When a hit takes place, the hit line in a fully associative cache memory must be deleted from the FIFO and a new identical line must be written into the FIFO. This requires all the lines "above" the hit line to be moved down by one.

This type of typical prior art fully associative cache memory implementation is very complex and costly, requiring access to all locations in a large FIFO, with the capability of extracting individual locations. Thus, traditional FIFO implementations would not work for this type of cache system, and specialized and complex circuitry is required to accomplish the desired functions.

Therefore, there existed a need to provide an improved fully associative cache memory which has a linked list structure and which is controlled by a finite state machine to allow for an efficient fully associative cache memory implementation which requires a minimal amount of circuitry.

SUMMARY OF THE INVENTION

According to the present invention, a simple and efficient fully associative cache memory system is provided which uses a finite state machine and a linked list structure to efficiently control operation of the cache without the high level of circuitry and complexity required by solutions of the prior art. This requires that each cache location (address) have a pointer that points to the previous cache line (PRV) and another pointer that points to the next cache line (NXT). In addition, registers are provided which point to the Least Recently Used line (LRU), which point to the Most Recently Used line (MRU), and which provide a counter (CNTR) and a FULL flag. The finite state machine controls the linking of the cache locations and the manipulation of the LRU, MRU, CNTR and the appropriate PRV and NXT fields to keep the cache appropriately linked.

The foregoing and other features and advantages will be apparent from the following description of the preferred exemplary embodiment of the invention as illustrated in the accompanying drawings.

BRIEF DESCRIPTION OF THE DRAWINGS

The preferred exemplary embodiment of the present invention will hereinafter be described in conjunction with the appended drawings, where like designations denote like elements, and.

DETAILED DESCRIPTION OF A PREFERRED EXEMPLARY EMBODIMENT

Figure 1:
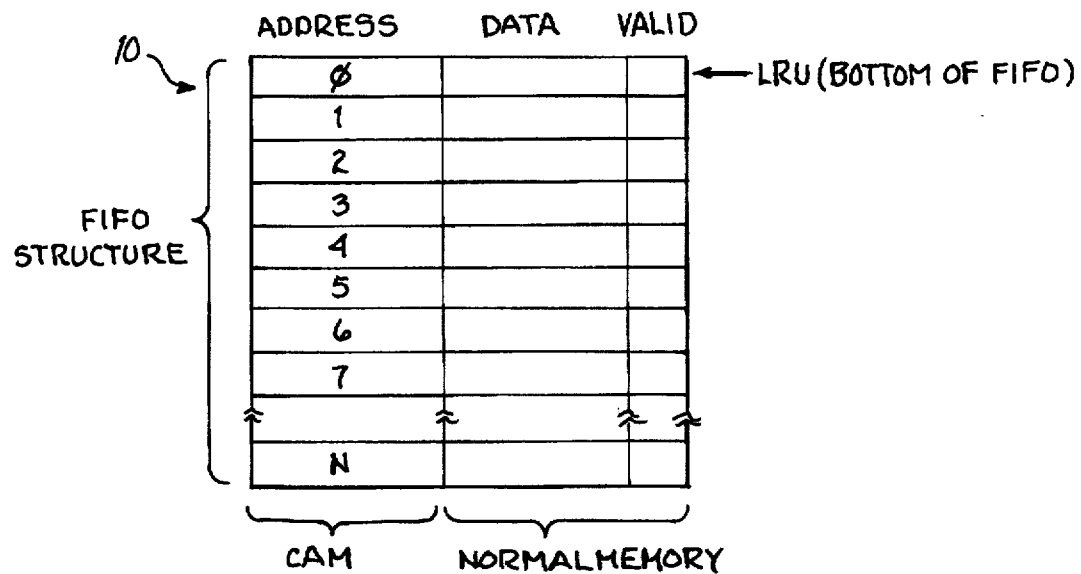
FIG. 1 is a block diagram view of a typical fully associative cache memory system of the prior art.

Referring to the figures, FIG. 1 shows a typical prior art fully associative cache memory system 10 which uses a content addressable memory in a FIFO implementation, but only for the address portion thereof. Each location within cache 10 has an address field, a data field, and a Valid bit. The Valid bit is zero when the cache line does not have valid data, and is one when the cache line has valid data. This type of implementation requires the FIFO to collapse on previously hit locations. This means, for example, that if a line of cache data is hit at location 2 of the FIFO, all the lines of the FIFO must shift down accordingly. Thus the data at line 2 is "collapsed", resulting in the later occurrence of data being the only occurrence of the data after the collapse.

Figure 2:
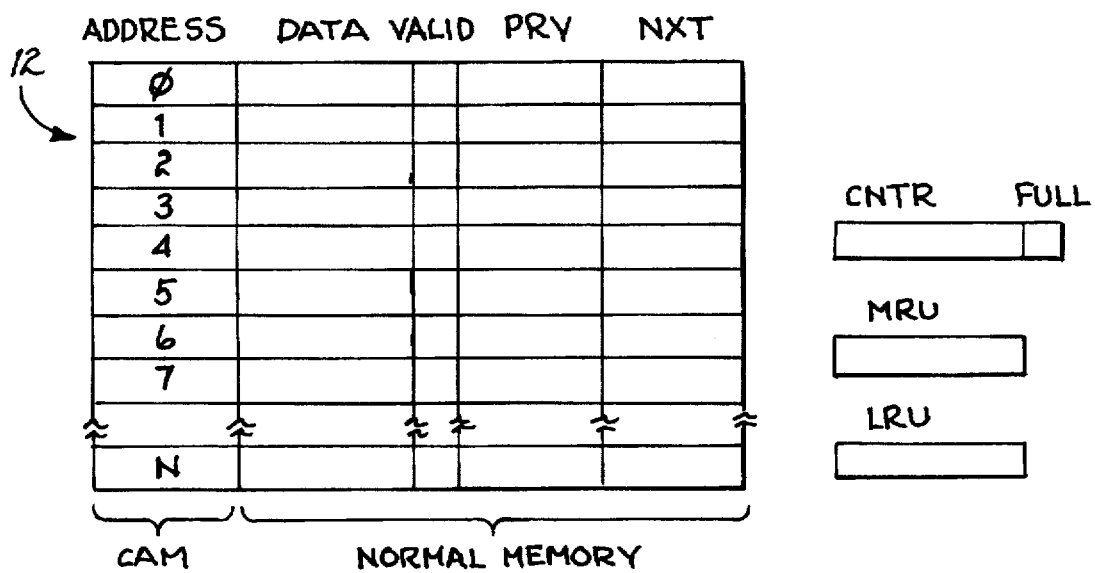
FIG. 2 is a block diagram view of the improved fully associative cache memory in accordance with the present invention.

The fully associative cache memory of the present invention eliminates the need for a FIFO memory arrangement and its attendant requirement of collapsing hit locations within the FIFO. Instead, a cache memory 12 is provided as shown in FIG. 2. The Address field, Data field, and Valid bits are the same as for the implementation of the prior art. The difference is that each cache location also has two additional fields to allow for a linked list structure in the cache. The PRY field points to the location in the cache that precedes the current location in the linked list, and the NXT field points to the location in the cache that succeeds the current location in the linked list. In addition, registers are provided for a Counter (CNTR), a Full flag (FULL), a Most Recently Used pointer (MRU), and a Least Recently Used pointer (LRU). The operation of the cache memory 12 is controlled by a Finite State Machine (FSM) (not shown), the function of which is described below.

Operation

The FSM functions to create and maintain a linked list structure in fully associative cache memory 12. It accomplishes this by manipulating the data in the LRU, MRU, PRV and NXT pointers. The PRV field of the LRU line is set to point to the LRU line, indicating that there is no "previous" line. The NXT field of the MRU line will point to the MRU line, indicating that there is no "next" line. The CNTR indicates the number of cache lines used, and serves as a pointer to the next cache location to be used while the cache is not full. The FULL flag is set when the CNTR overflows to zero, indicating that fully associative cache memory 12 is full. Note that MRU, LRU, CNTR, FULL, and all Valid bits are initialized to zero upon power-up or when the cache is flushed.

The Finite State Machine (FSM) controls the operation of the fully associative cache memory 12 of the present invention. The operation of the FSM varies depending on whether the next cache access is:

1) a Miss in a non-full cache
2) a Miss in a full cache
3) a Hit at the MRU cache location
4) a Hit at the LRU cache location
5) a Hit at a cache location that is not LRU or MRU Each of these scenarios will be discussed in turn. Note that temporary values of LRU and MRU are used from time to time in the discussion below, and are called OLDLRU and OLDMRU.

Miss in a Non-Full Cache (FULL=0)

If there is a cache miss and the cache is not full, the new line needs to be written into the cache at the next available location, which is addressed by CNTR. This is accomplished by the FSM performing the following sequence of operations:

1) Write the new cache line to the cache location pointed to by CNTR, and set the corresponding Valid bit
2) Write CNTR to the NXT field of the cache location pointed to by MRU
3) Write CNTR to the NXT field of the cache location pointed to by CNTR
4) Store MRU as OLDMRU
5) Write CNTR to MRU
6) Increment CNTR
7) Write OLDMRU to PRV field of cache location pointed to by MRU Miss in a Full Cache (FULL=1)

If there is a cache miss and the cache is full, the new line needs to replace the oldest line in the cache, which means that the new line needs to be written into the cache at the location pointed to by the LRU pointer and converted to MRU. The location succeeding the old LRU location needs to be converted to LRU. This is accomplished by the FSM performing the following sequence of operations:

1) Store LRU as OLDLRU
2) Write contents of NXT field at the cache location pointed to by LRU to LRU
3) Write LRU to PRV field at the cache location pointed to by LRU
4) Write the new cache line to the cache location pointed to by OLDLRU, and set the corresponding Valid bit
5) Write OLDLRU to the NXT field of the cache location pointed to by OLDLRU
6) Write MRU to the PRV field of the cache location pointed to by OLDLRU
7) Store MRU as OLDMRU
8) Write OLDLRU to MRU
9) Write OLDLRU to NXT field of the cache location pointed to by OLDMRU Hit at the MRU Cache Location No action required Hit at the LRU Cache Location If there is a cache hit at the LRU Cache Location, the location succeeding the hit location needs to be converted to LRU, and the hit location needs to be converted to MRU. This is accomplished by the FSM performing the following sequence of operations:

1) Store LRU as OLDLRU
2) Write contents of NXT field at cache location pointed to by LRU to LRU
3) Write LRU to PRV field at cache location pointed to by LRU
4) Write OLDLRU to the NXT field of the cache location pointed to by OLDLRU
5) Write MRU to the PRV field of the cache location pointed to by OLDLRU
6) Store MRU as OLDMRU
7) Write OLDLRU to MRU
8) Write OLDLRU to NXT field of the cache location pointed to by OLDMRU Hit at a Cache Location that is not LRU or MRU If there is a cache hit at a location that is neither LRU nor MRU, the hit location's preceding and succeeding locations need to be altered to point to each other; the MRU location needs to point to the hit location and the hit location needs to be converted to MRU. This is accomplished by the FSM performing the following sequence of operations:

1) Write NXT field of cache hit location to NXT field of cache location pointed to by PRV field of cache hit location
2) Write PRV field of cache hit location to PRV field of cache location pointed to by NXT field of cache hit location
3) Store MRU into OLDMRU
4) Write cache hit location to its own NXT field
5) Write cache hit location to MRU
6) Write cache hit location to NXT field of location pointed to by OLDMRU
7) Write OLDMRU into PRV field of cache hit location The nature of CPU accesses is such that any of the sequences of operations described above can be totally overlapped with bus activity before the CPU sends out a new request. For example, in a '486 based system, sequential cache hits for reads present the worst case scenario for FSM timing. In this scenario, however, the burst transfer of four d-words into the CPU gives the FSM at least 6 or 7 bus clocks to complete one of the required sequences (as listed above) before the next hit can occur. A miss in the cache would allow the FSM even more time to perform its manipulations, since normal DRAM systems would take 6–10 clocks to provide a new line to the Fill Buffer of the cache. In either case, the FSM can be easily designed to complete its sequence before the CPU starts a new bus cycle. This means that the FSM of the cache memory can operate without delaying the processing time of the CPU.

While the invention has been described in its preferred exemplary embodiment, it is to be understood that the words which have been used are words of description rather than limitation, and that changes may be made within the purview of the appended claims without departing from the true scope and spirit of the invention in its broader aspects.

What is claimed is:

1. A method for controlling a fully associative cache memory including the steps of:

providing a memory array having a plurality of locations, each of said plurality of locations having an ADDRESS field, a DATA field, a VALID bit which is set when the data in the DATA field is valid, a previous field (PRV), and a next field (NXT);

providing a least recently used (LRU) pointer for pointing to one of said plurality of locations which was least recently used;

providing a most recently used (MRU) pointer for pointing to one of said plurality of locations which was most recently used;

providing a counter (CNTR) which indicates the number of said plurality of locations filled, said counter having a FULL bit which is set when said CNTR overflows, indicating that said cache memory is full;

providing finite state machine means for storing information into said cache memory and for writing data to appropriate PRV and NXT fields within the memory array to create a linked list data structure within the cache memory;

said finite state machine means performing the following steps when a required line is not within the cache memory (cache miss) and the cache memory is not full (FULL=0):
  a) creating a temporary storage variable OLDMRU;
  b) writing the new cache line to the location pointed to by CNTR, and set the corresponding Valid bit;
  c) writing CNTR to the NXT field of the location pointed to by MRU;
  d) writing CNTR to the NXT field of the location pointed to by CNTR;
  e) storing MRU as OLDMRU;
  f) writing CNTR to MRU;
  g) incrementing CNTR; and
  h) writing OLDMRU to PRV field of the location pointed to by MRU;

said finite state machine means performing the following steps when the required line is not within the cache memory (cache miss) and the cache memory is full (FULL=1):
  a) creating a temporary storage variable OLDLRU;
  b) storing LRU as OLDLRU;
  c) writing contents of NXT field at the location pointed to by LRU to LRU;
  d) writing LRU to PRV field at the location pointed to by LRU;
  e) writing the new cache line to the location pointed to by OLDLRU, and set the corresponding Valid bit;
  f) writing OLDLRU to the NXT field of the location pointed to by OLDLRU;
  g) writing MRU to the PRV field of the location pointed to by OLDLRU;
  h) storing MRU as OLDMRU;
  i) writing OLDLRU to MRU; and
  j) writing OLDLRU to NXT field of the location pointed to by OLDMRU;

said finite state machine means performing the following steps when the required line is at the LRU address within the cache memory (cache hit):
  a) creating temporary storage variables OLDLRU and OLDMRU;
  b) storing LRU as OLDLRU;
  c) writing contents of NXT field at the location pointed to by LRU to LRU;
  d) writing LRU to PRV field of the location pointed to by LRU;
  e) writing OLDLRU to the NXT field of the location pointed to by OLDLRU;
  f) writing MRU to the PRV field of the location pointed to by OLDLRU;
  g) storing MRU as OLDMRU;
  h) writing OLDLRU to MRU; and
  i) writing OLDLRU to NXT field of cache location pointed to by OLDMRU;

said finite state machine means performing the following steps when the required line is at a location other than the LRU or the MRU within the cache memory (cache hit):
  a) creating a temporary storage variable OLDMRU;
  b) writing NXT field of the cache hit location to NXT field of the location pointed to by PRY field of the cache hit location;
  c) writing PRV field of the cache hit location to PRV field of the location pointed to by NXT field of the cache hit location;
  d) storing MRU into OLDMRU;
  e) writing the cache hit location to its own NXT field;
  f) writing the cache hit location to MRU;
  g) writing the cache hit location to NXT field of the location pointed to by OLDMRU; and
  h) writing OLDMRU into PRY field of the cache hit location.

2. A method for controlling a fully associative memory including the steps of:

providing a memory array having a plurality of locations each of said plurality of locations having an ADDRESS field, a DATA field, a VALID bit which is set when the data in the DATA field is valid, a previous field (PRY), and a next field (NXT);

providing a least recently used (LRU) pointer for pointing to one of said plurality of locations which was least recently used;

providing a most recently used (MRU) pointer for pointing to one of said plurality of locations which was most recently used;

providing a counter (CNTR) which indicates the number of said plurality of locations filled, said counter having a FULL bit which is set when said CNTR overflows, indicating that said cache memory is full;

providing finite state machine means for storing information into said cache memory and for writing data to appropriate PRV and NXT fields within the memory array to create a linked list data structure within the cache memory;

said finite state machine writing a required line of information at a next available location addressed by said CNTR when said required line is not within said cache memory (cache miss) and said cache memory is not full (FULL=0);

said finite state machine writing said required line of information at a location pointed to by said LRU, converting said MRU pointer to point to said location pointed to by said LRU, and converting said LRU pointer to point to a location succeeding said location pointed to by said LRU pointer when said required line is not within said cache memory (cache miss) and said cache memory is full (FULL=1);

said finite state machine converting a location succeeding a hit location to said LRU location and converting said hit location to said MRU location when said required line is at said LRU location within said cache memory (cache hit); and said finite state machine altering a location preceding and a location succeeding said hit location to point to one another and converting said hit location to said MRU location when said required line is at a location other than said LRU location or said MRU location within said cache memory (cache hit).

3. The method of claim 2 wherein said step of writing a required line of information at a next available location addressed by said CNTR when said required line is not within said cache memory and said cache memory is not full comprising the steps of:

creating a temporary storage variable OLDMRU;

writing the new cache line to the location pointed to by CNTR and set the corresponding VALID bit;

writing CNTR to the NXT field of the location pointed to by MRU;

writing CNTR to the NXT field of the location pointed to by CNTR;

storing MRU as OLDMRU;

writing CNTR to MRU;

incrementing CNTR; and writing OLDMRU to PRV field of the location pointed to by MRU.

4. The method of claim 3 wherein said step of writing said required line of information at a location pointed to by said LRU, converting said MRU pointer to point to said location pointed to by said LRU, and converting said LRU pointer to point to a location succeeding said location pointed to by said LRU pointer when said required line is not within said cache memory and said cache memory is full comprises the steps of:

creating a temporary storage variable OLDLRU;

storing LRU as OLDLRU;

writing contents of NXT field at the location pointed to by LRU to LRU;

writing LRU to PRV field at the location pointed to by LRU;

writing the new cache line to the location pointed to by OLDLRU, and set corresponding VALID bit;

writing OLDLRU to the NXT field of the location pointed to by OLDLRU;

writing MRU to the PRV field of the location pointed to by OLDLRU;

storing MRU as OLDMRU;

writing OLDLRU to MRU; and writing OLDLRU to NXT field of the location pointed to by OLDMRU.

5. The method of claim 2 wherein said step of converting a location succeeding a hit location to said LRU location and converting said hit location to said MRU location when said required line is at said LRU location within said cache memory comprising the steps of:

creating temporary storage variables OLDLRU and OLDMRU;

storing LRU as OLDLRU;

writing contents of NXT field at the location pointed to by LRU to LRU;

writing LRU to PRV field of the location pointed to by LRU;

writing OLDLRU to the NXT field of the location pointed to by OLDLRU;

writing MRU to the PRV field of the location pointed to by OLDLRU;

storing MRU as OLDMRU;

writing OLDLRU to MRU; and writing OLDLRU to NXT field of cache location pointed to by OLDMRU.

6. The method of claim 2 wherein said step of altering a location preceding and a location succeeding said hit location to point to one another and converting said hit location to said MRU location when said required line is at a location other than said LRU location or said MRU location within said cache memory comprises the steps of:

creating a temporary storage variable OLDMRU;

writing NXT field of the cache hit location to NXT field of the location pointed to by PRV field of the cache hit location;

writing PRV field of the cache hit location to PRV field of the location pointed to by NXT field of the cache hit location;

storing MRU into OLDMRU;

writing the cache hit location to its own NXT field;

writing the cache hit location to MRU;

writing the cache hit location to NXT field of the location pointed to by OLDMRU; and writing OLDMRU into PRV field of the cache hit location.

* * * * *